June 6, 1933.  J. ZUBATY  1,913,147
ODOMETER
Original Filed March 11, 1926  2 Sheets-Sheet 1
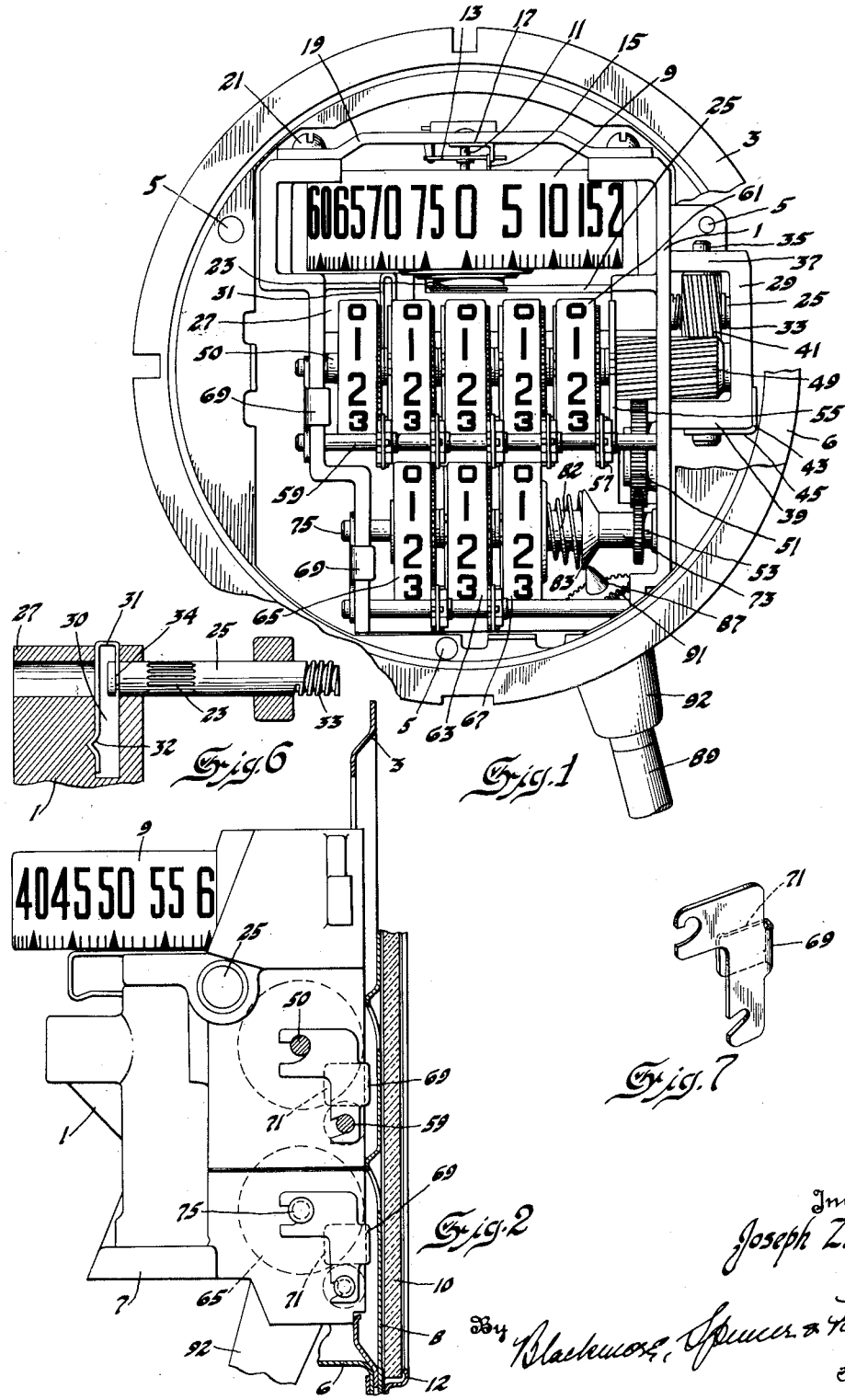

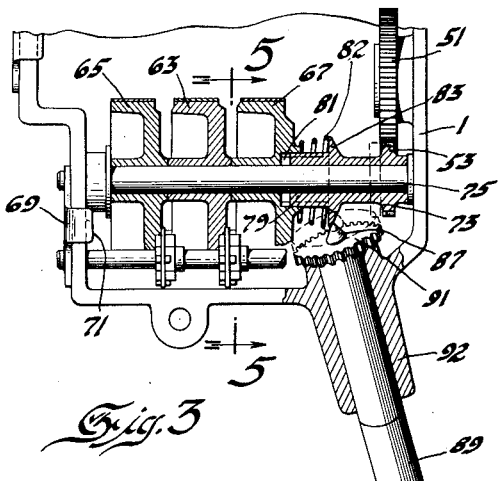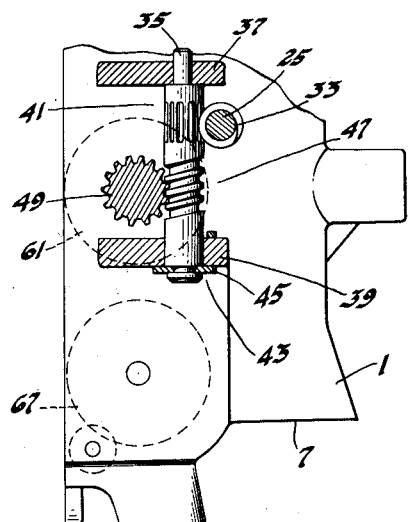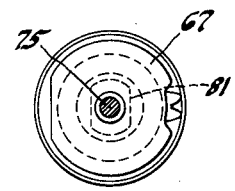

Patented June 6, 1933

1,913,147

UNITED STATES PATENT OFFICE

JOSEPH ZUBATY, OF FLINT, MICHIGAN, ASSIGNOR TO A. C. SPARK PLUG COMPANY, OF FLINT, MICHIGAN, A COMPANY OF MICHIGAN

ODOMETER

Original application filed March 11, 1926, Serial No. 94,097. Divided and this application filed November 12, 1930. Serial No. 495,091.

This invention relates to a novel speedometer having combined therewith an odometer as usual; and this application is a division of my application filed March 11, 1926, Serial No. 94,097, relating to odometers.

The new instrument has been designed to overcome various objections and limitations inherent in prior devices, and to this end involves a single frame element which is somewhat of box shape to permit easy die casting and in which the odometer shaft, the rotor shaft, and the interconnecting gearing are directly mounted. This is an improvement over a frame of detachable parts in that it simplifies manufacture and secures proper alignment of parts.

This particular application relates to features of novelty in the odometer used in the combination. The novel features have been designed with the view to make an improved odometer for use with an associated speedometer on vehicles, but it will be understood that the construction may be useful in other relations.

Among the objects which the invention seeks to accomplish are the following: An improvement in the odometer drive including means for assembling and securing in position the several shafts; an improved position of the reset stem; an improved reset mechanism; and an improved relation between the odometer figure wheels and their related star wheels.

The above mentioned and other objects are obtained by the structure herein described and shown on the accompanying drawings. It will be understood that this structure is illustrative of what is now believed to be the best to accomplish the above objects but that changes and modifications may be made within the scope of the claims.

In the drawings:

Figure 1 is a front view of the combined speedometer and odometer on an enlarged scale, the face plate being removed.

Figure 2 is a side elevation looking from the left of Figure 1.

Figure 3 is a vertical sectional view of the trip wheel set of the odometer and its reset mechanism.

Figure 4 is a side elevation, parts being in section, looking from the right of Figure 1.

Figure 5 is a section on line 5—5 of Figure 3.

Figure 6 is a vertical sectional view illustrating the assembly of the second worm shaft.

Figure 7 is a perspective view of a detail.

Referring now to the drawings for a complete description, numeral 1 represents a frame which carries the speedometer and odometer parts. This frame is a single boxshaped member and receives the various parts of the speedometer and odometer, thereby simplifying the manufacture and ensuring a correct alignment of parts. 3 is a mounting plate, annular in shape, and secured to the frame by fastening means 5. This frame is to be enclosed in a casing 6. For connecting the casing 6 to the mounting plate 3 there is shown a face plate 8, a glass 10 and a bezel 12. From Figure 2 it will be understood that the bezel engages the front of the glass and is bent over and holds together a flange on the casing, the mounting plate and also the face plate. It may be said here that the mounting plate 3 possesses some degree of resiliency whereby shocks given to the casing 6 are avoided by the frame and its speedometer and odometer mechanism.

The drive shaft for the speedometer is admitted to the frame at 7 where it is coupled to a vertical rotor shaft, not shown. This rotor shaft extends through the vertical frame portion illustrated in Figure 2 and Figure 4. This shaft, as usual, carries a rotor (not shown as it is not material to this invention). The speed cup which surrounds the rotor appears as at 9, its spindle being designated as 11 and the controlling spring by 13. The pin 15 and lug 17 constitute the zero stop mechanism. It will be observed that the upper spindle bearing is carried by frame member 19 secured by screws 21 to the frame member.

Extending at right angles to the rotor shaft and geared thereto at 23 at a point just beneath the rotor and speed cup is the so-called second worm shaft 25. This shaft is arranged to be assembled from either end of the frame as at 27 and 29 (see Figure 1 and Figure 6). For holding this shaft from axial movement, a U-shaped clip is used, as shown at 31. This clip enters a recess 30 in the frame and engages a groove 34 in the shaft. It has a V-shaped portion 32 engaging a depression in the frame member.

Adjacent one end of this second worm shaft it is formed with a worm 33. A third worm shaft 35 extends vertically (it being understood that the speedometer is mounted on the dash). This shaft is mounted at two spaced positions, 37 and 39 in the frame member as shown in Figure 4. It overlies the second worm shaft and has a worm 41 for driving engagement therewith. A clip 43 of U-shape has its bend and one leg engaged over a frame part and its long leg 45 is forked to engage a grooved part of the shaft 35 to hold this shaft in its vertical position and prevent axial movement. This structure is shown at Figure 1 and Figure 4. It will be noticed also from an inspection of Figure 1 that when the casing is in position over the frame, the clip lies so closely adjacent to the casing that it cannot slip off and release its hold on shaft 35. This third worm shaft is provided near its lower end with a worm 47 which is in driving engagement with a worm gear 49. This worm gear 49 is on the shaft 50 of the "season" set of figure wheels of the odometer. The worm 49 is made use of to drive the "trip" set of figure wheels. To that end it engages an idler 51 which in turn drives a spur gear 53. This spur gear, by a mechanism to be described, drives the "trip" set wheels.

A disk 55 on shaft 50 has two teeth to engage a tooth of a star wheel 57 on star wheel shaft 59. This star wheel is in driving engagement with the figure wheel 61 of lowest denomination of the "season" set. In a similar way each succeeding wheel of the season set is driven, and the "units" wheels 63 and the "tens" wheels 65 of the "trip" set are driven from the fractional wheel 67, there being, as will be understood, a second star wheel shaft as shown in Figure 1. A feature to which we attribute considerable importance in this connection is the relative position of the shafts of the figure wheels and the shafts of their respective star wheels. The star wheel shafts have commonly been placed closely adjacent each other and between the two figure wheel shafts. By locating the star wheel shafts each in the same relation to its figure wheel shafts, as for example, forward and below, as best shown in Figure 2, the double tooth driving member of each figure wheel may be placed in the same position on its wheel whether the wheel be intended for the "season" set or the "trip" set. It will be seen from Figure 1 that this double tooth may be between Figures 1 and 2 on each wheel of both sets. No "rights" or "lefts" are therefore required and the figure wheels become interchangeable, thus doing away with the necessity of manufacturing the double set of figure wheels and consequently effecting considerable economy.

In connection with the mounting of the shafts of the figure wheels and star wheels another improvement is to be noted. These shafts engage at their ends in bearing portions of the frame and to secure them in position in a manner to prevent axial movement, two clips 69 are employed, one for each pair of shafts. These clips are alike and each is formed as a U-shaped stamping having a short arm 71 engaging an inner frame wall and an outer arm of approximately L shape. A suitably shaped notch in each end of the L shaped arm engages a groove adjacent the end of the number wheel shaft and its adjacent star wheel shaft. This structure is clearly shown in the perspective view, Figure 7, also in Figure 1 and Figure 2. The end of the shorter arm may be bent up slightly to facilitate assembly. When placed in position its frictional grip on the frame holds it in position such that the shafts are prevented from longitudinal displacement. It will be observed from an inspection of Figure 2 that the bent portion of this clip lies closely beneath the face plate when that plate is assembled on the casing. Because of this relative position of the clip and the face plate it is impossible for the clip to slip forward and release the shafts which it holds.

Figure 3 shows to best advantage the reset mechanism. Here will be seen a sleeve 73 rotatably and slidably mounted upon the trip figure wheel shaft 75. At one end this sleeve carries the spur gear 53 mentioned above engaging the idler 51. The other end of the sleeve is non-circular in shape as at 79 and is slidable within a correspondingly shaped opening 81 in the fractional wheel 67. In its various positions of movement the sleeve is always in driving engagement with the fractional wheel, but if moved deep into the opening of the figure wheel the gear 53 becomes disengaged from gear 51. For the purpose of normally maintaining the gear engagement a spiral coil spring 82 is used. This spring engages the surface of the fractional wheel and an abutment 83 on the sleeve, which takes the form of a conical cam. The sleeve 73, gear 53 and the conical cam of the abutment 83 together form what I call a cam and gear element, and the conical cam is engaged by a corresponding cam 87 on the reset shaft 89. Just beneath the cam 87 on the shaft 89 is a gear 91. The reset shaft is mounted to be rotated and reciprocated in a frame extension 92. As this reset shaft is projected inwardly the cam members engage and the gear 53 is disengaged from the idler 51 and the gear element 91 on the reset spindle is brought into engagement with the pinion 53.

Rotation of the reset spindle under these circumstances causes the rotation of the cam member and enables the trip set to be given a desired reading.

Another feature of importance should be observed in connection with this reset device. The angle at which the reset spindle is positioned will be seen from an inspection of Figure 1 and Figure 2 to be about 15° from the vertical in two directions, laterally and rearwardly. This position of the reset spindle secures the following advantageous results. It facilitates the mounting of the instrument from the front through an opening provided therefor in the instrument board. It gives sufficient distance between the driving flexible shaft and the handle portion of the reset spindle so that the driver's fingers are not likely to touch the flexible drive shaft. It provides also in a similar way sufficient distance between the lower edge of the instrument board and the spindle to give room for convenient maniplation. Furthermore this position makes possible a very desirable pitch to the cam members for operating the slidable clutch.

I claim:

1. In a shaft assembly, a frame, the shaft having a bearing in said frame, securing means for said shaft comprising a U-shaped clip having a portion engaging the shaft to prevent longitudinal movement of the shaft relative to the clip and the clip engaging the frame to prevent its movement relative to the frame in the direction of the axis of the shaft and having a part engaging the frame to resiliently hold it from moving in the direction of its movement of assembly.

2. A frame, a shaft, a bearing therefor in said frame, a fastening clip of U-shape, the shaft having a groove receiving one leg of the U clip, the other leg of the clip provided with a projection received in a notch in the frame.

3. A frame having a bearing opening and a recess transversely positioned relative to the opening, a shaft mounted in said bearing, the shaft having a groove in the recess, a U-shaped clip extended into said recess, one leg of the clip engaging in the groove, the other leg of the clip having a V-shaped portion engaging in the notch of the frame.

4. A frame, an enclosing casing including a cover, a shaft engaging bearings in said frame, a U-shaped clip, one leg of the clip engaging the frame, the other leg engaging a groove in the shaft, the bowed portion of the clip lying adjacent a portion of the casing to thereby prevent movement of said clip when the frame is in place within the casing.

5. A frame member including a wall, a pair of adjacent shafts extending therethrough, the shafts having grooves beyond their bearings in the frame, a single U-shaped clip frictionally held by the frame and having on one leg a pair of notches to engage the grooves of the shafts to hold the shafts from longitudinal movement.

In testimony whereof I affix my signature.

JOSEPH ZUBATY.